United States Patent [19]

Kim et al.

[11] Patent Number: 4,674,281
[45] Date of Patent: Jun. 23, 1987

[54] METHOD OF POWER GENERATION AND ITS APPARATUS UTILIZING GRAVITATION FORCE AND BUOYANCY

[76] Inventors: Myung K. Kim, 9018 Dolfield Rd., Owings Mills, Md. 21117; Se Eun Lee, 345-45 Kaebong-dong, Kuro-ku, Seoul; Baek K. Shin, 31-49 Kahoe-dong, Chongro-ku, Seoul, both of Rep. of Korea

[21] Appl. No.: 863,840

[22] Filed: May 16, 1986

[51] Int. Cl.⁴ .............................................. F03G 3/00
[52] U.S. Cl. ......................................... 60/496; 60/503
[58] Field of Search .......................... 60/496, 502, 503

[56] References Cited
U.S. PATENT DOCUMENTS

| 921,637 | 5/1909 | Vanderslice | 60/503 |
| 999,579 | 8/1911 | Mecham | 60/503 |
| 1,550,408 | 8/1925 | Witt | 60/496 |
| 1,557,290 | 10/1925 | Ippolito | 60/503 |

Primary Examiner—Allen M. Ostrager
Attorney, Agent, or Firm—Birch, Stewart, Kolasch & Birch

[57] ABSTRACT

An apparatus for the generation of power which comprises a first cylinder and a second cylinder, a first float member and a second float member disposed in the first and second cylinders, respectively, a first inner cylinder and a second inner cylinder disposed in the first and second float members, respectively, a first lever and a second lever connected to the first and second float members, a crank member rotatably disposed on a crank shaft, a pair of arms connected at one end to the crank member and at the other end to the first and second levers, introducing and removing member of a fluid to and from the first and second cylinders, introducing and discharging member of air to and from the first and second float members, whereby when the fluid and air are introduced into the first cylinder and float member, and simultaneously removed from the second cylinder and float member, the first float member is caused to rise in the first cylinder and the second float member is caused to fall in the second cylinder, causing the levers to move up and down and causing the crank to rotate about its crank shaft.

15 Claims, 9 Drawing Figures

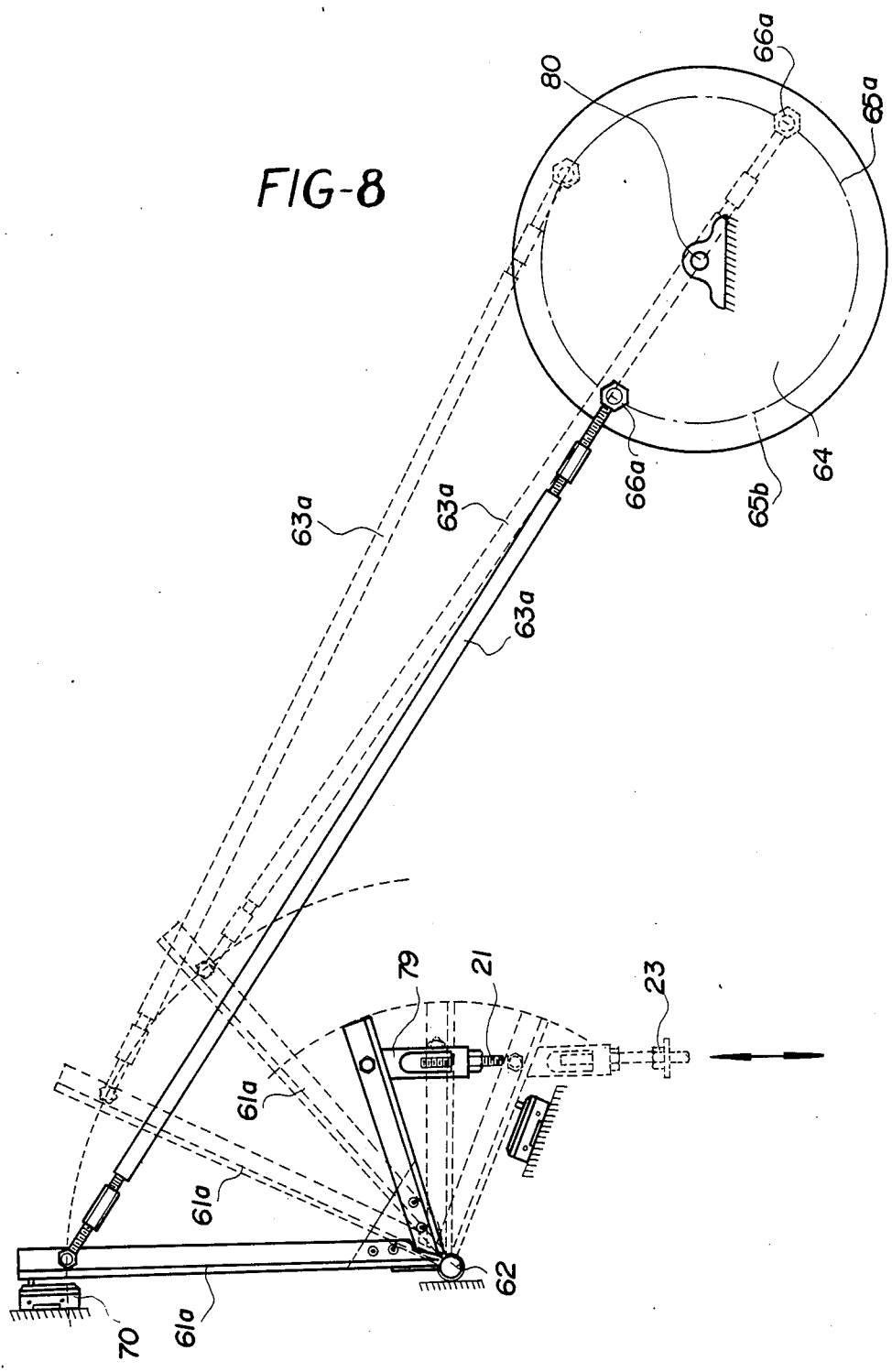

METHOD OF POWER GENERATION AND ITS APPARATUS UTILIZING GRAVITATION FORCE AND BUOYANCY

BACKGROUND OF THE INVENTION

The present invention relates to a method of power generation and its apparatus utilizing gravitation force and buoyancy, wherein a bigger out-put force than in-put can be obtained by adding to the in-put power the force generated by the action of gravity and buoyancy.

Previously, many methods and/or apparatus utilizing gravity and buoyancy principles have been developed which claim that they can be utilized to generate a larger out-put than in-put. However, such devices have proven to be only theoretical and thus do not have practical use for the claimed purpose.

However, the present invention provides a method and apparatus which is practically utilizable as a separate source of power generation.

OBJECTS AND SUMMARY OF THE INVENTION

Accordingly, it is an object of the present invention to provide a practical apparatus for generating power utilizing gravitation force and buoyancy.

Another object of the present invention is to provide a power generating apparatus which is both simple in application to other devices such as generators and is low in manufacturing cost.

A further object of the present invention is to provide a power generating apparatus which comprises two cylinders and two float members disposed in the cylinders, respectively, the float members having respective weight members disposed thereon, whereby the out-put force resulting from the action of the float members moving up and down can be utilized with other known apparatus such as a generator by converting rotational motion to rectilinear motion or rectilinear motion to rotational motion.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to an apparatus for the generation of power which comprises a first cylinder and a second cylinder, a first float member and a second float member disposed in the first and second cylinders, respectively, the float members including corrugated air bags therein, a weight member disposed on the float member, an inlet and outlet for introducing and removing a fluid, i.e., water, into and out of the first and second cylinders and an inlet and outlet for introducing and removing air into and out of the first and second float members, whereby when the fluid and air are introduced into the first cylinder and first float member and simultaneously removed from the second cylinder and second float member, the first float member is caused to rise in the first cylinder and the second float member is caused to fall in the second cylinder. Thus, the weight member disposed on the float member causes the floating member containing the corrugated section to be compressed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 diagrammatically shows the lever system for converting rectilinear motion to rotational motion as defined by the present invention.

DETAILED DESCRIPTION OF THE INVENTION

Figure 1:
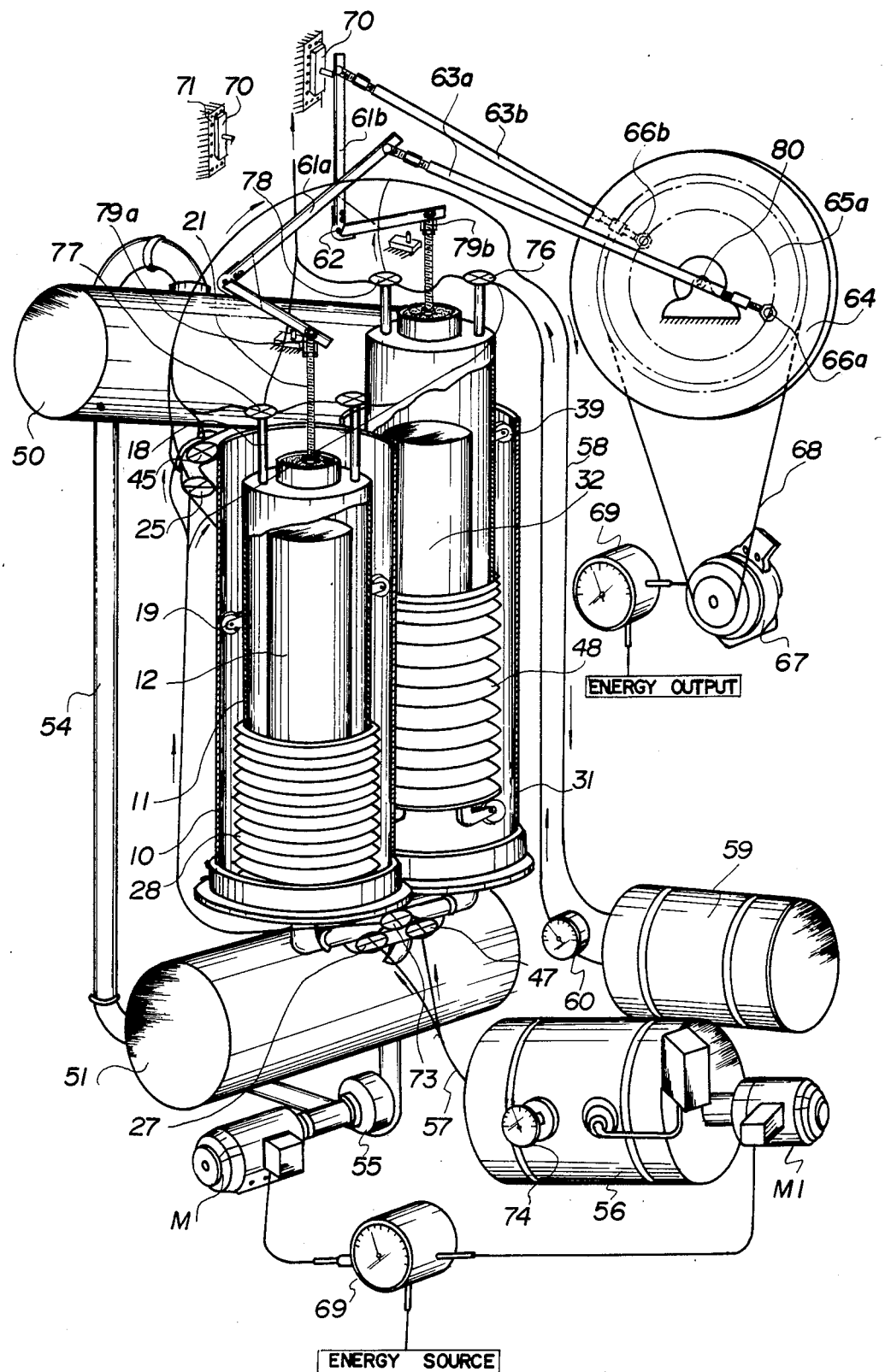
FIG. 1 is a perspective view of a power generation apparatus of the present invention.
Figure 2A:
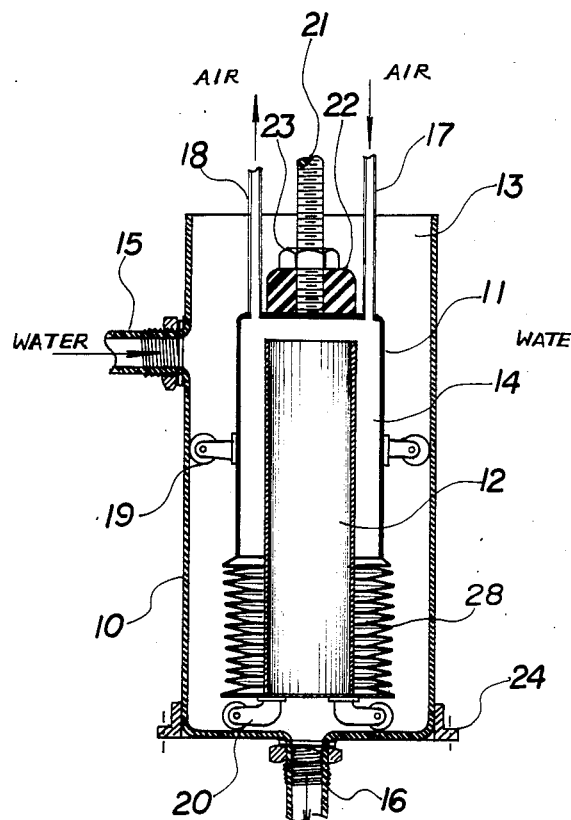
FIG. 2A is a cross-sectional view of a first cylinder containing a first float member in its lowermost position.
Figure 2B:
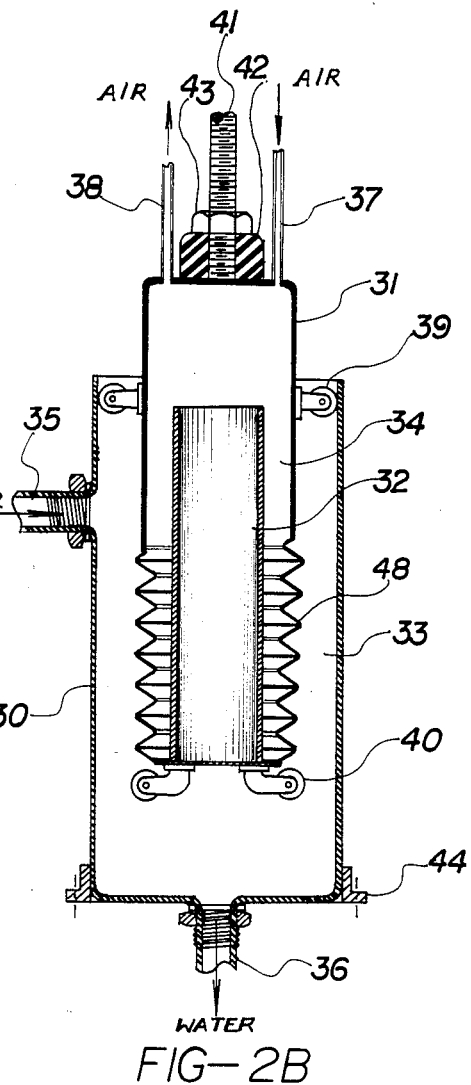
FIG. 2B is a cross-sectional view of a second cylinder containing a second float member in its raised position.
Figure 3:
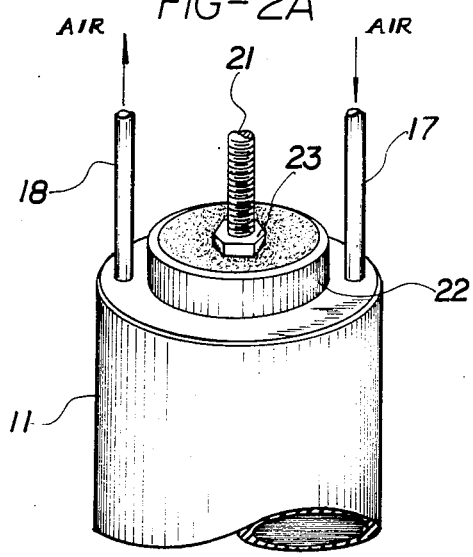
FIG. 3 is a perspective view of the weight member disposed on the float member of the present invention.

Referring now in detail to the drawings for the purpose of illustrating the present invention, the power generating apparatus of the present invention as shown in FIG. 1 comprises a first cylinder 10 and a second cylinder 30, of an upper end open-type, a first float member 11 and a second float member 31 disposed in the first and second cylinders 10 and 30, respectively, a first inner cylinder 12 and a second inner cylinder 32 disposed in the first and second float members 11 and 31, a first weight member 22 and a second weight member 42 disposed on the top of the first and second float members 11 and 31. The uppers of cylinders 10 and 30 are provided with water supply pipes 15 and 35 which are connected to a water supply tank 50. The float members 11 and 31 can vertically float within the cylinders 10 and 30 when the spaces 13 and 33 between the float members and float members are filled by the water. Solenoid-type water supply valves 25 and 45 are located in the water supply pipes 15 and 35, respectively. Also, the bottoms of the cylinders 10 and 31 are linked with water drainage pipes 16 and 36, respectively, through a solenoid-type valve 73. The pipes 16 and 36 are also connected to water drainage tank 51 through pipes 26 and 46 and a common pipe 53. Pipes 26 and 46 are each provided with separate valves 27 and 47, respectively (see FIGS. 5, 6 and 7). The water drainage tank 51 is equipped with a water pump 55 through a motor M and the pump is connected to the water supply tank 50 with a hose or pipe 54. As shown in FIGS. 2A, 2B and 3, the first and second float members 11 and 31, the lower part of which is made of a flexible material such as plastic or rubber, are provided with connecting axis members 21, 41, air inlets 17, 37, and air outlets 18, 38. A plurality of side guide-rollers 19, 39 are mounted at the upper of the floating members, and a plurality of bottom guide-rollers 20, 40 are mounted at the bottom thereof. The float members 11, 31 contain corrugated portions 28, 48 disposed at the lower ends thereof so that the floating members 11 and 31 can vertically extend within the cylinders 10 and 30 when the spaces 14, 34 between the float members and inner cylinders 12, 32 are filled by the air. The weight members 22, 42 are mounted to the axis 21, 41 by nuts 23, 43 (FIG. 3). The weight of the weight members 22, 42 can be controlled in proportion to the size of the radius of the float members 11, 31 and the height of the cylinders 10, 30. For example, when the radius of the float members are 25 cm and the height of the cylinders are 100 cm, the weight of the weight members are 88.76 ft.lb., but, if the radius of the float members are increased to 50 cm and the height of the cylinders to 200 cm, the weight of the weight members are increased to 1,420.20 ft.lb., thus increases in linear.

The air inlets 17, 37 are connected to air storage tank 59 through solenoid-type valves 75, 76 as shown in FIGS. 2A and 2B. The air storage tank 59 is provided with a pressure gauge 60 for controlling the pressure therein. The motors M, M1 are connected to an ampere gauge 69 to know the energy in-put.

Figure 4:
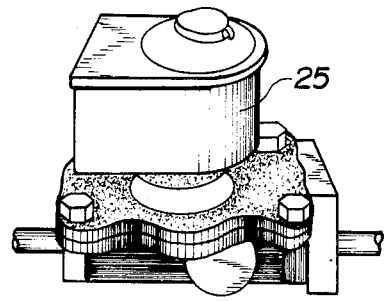
FIG. 4 is a perspective view of the solenoid-type valve of the present invention.

The air outlets 18, 38 which vent to the atmosphere for discharging the air are provided with solenoid-type valves 77, 78 for control purposes. An air compressor 56 having a pressure gauge 74 and the motor M1 is provided with an air hose 57 which is connected to each solenoid-type valve 25, 27, 35, 47, 73, 75, 76, 77 and 78 for activating on/off switches (FIG. 4). The air used in the solenoid-type valves is stored in the air storage tank 59 through a hose 58 for subsequent use by the floating members 11 and 31.

As shown in FIGS. 1 and 8, the axis members 21 and 41 are connected to one end of "L"-shaped levers 61a, 61b through connecting members 79a and 79b and the other end of the levers 61a, 61b are connected to one end of crank arms 63a, 63b. The other end of the crank arms 63a, 63b are connected to a crank 64 by crank pins 66a, 66b of the crank arms 63a, 63b to both side tracks 65a, 65b of the crank 64. The crank 64 having a crank shaft 80 can be connected to a generator 67 or the like through a belt 68. The generator 67 is provided with an ampere gauge 69 for displaying the energy out-put. The "L"-shaped levers 61a, 61b include a pivot pin 62 fixed to a stand member (not shown).

Figure 5:
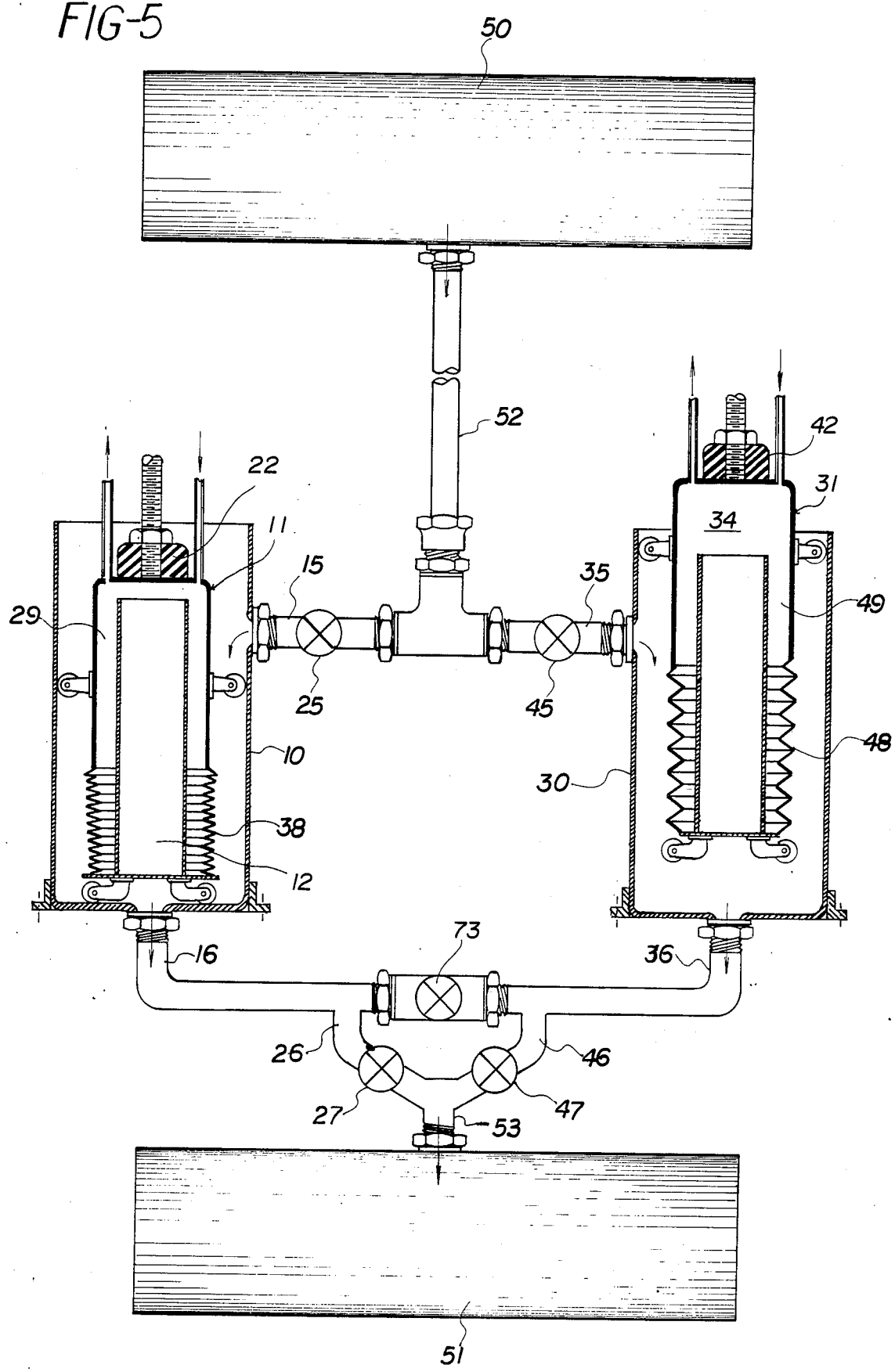
FIG. 5 diagrammatically shows the mechanical system of the present invention wherein the first float member is in its lowermost position and the second float member is in its raised position.

In operation, as shown in FIGS. 1, 5 and 8, the water supply valve 45 is opened to supply to the second cylinder 30 and the air inlet valve 76 is opened to supply to the second float member 31. Simultaneously, after closing the horizontal valve 73 and valve 47, the drainage valve 27 is opened to drain the first cylinder 10 and the air outlet valve 77 is opened to vent the air from the first floating member 11. The second float member 31 within the second cylinder 30 is then raised due to buoyancy force and air filling the corrugated section 48 to its highest point while the first float member 11 is lowered to its lowest position by gravitational force. The weight member 22 on the first floating member 11 assists the gravitational force and when the water in the first cylinder 10 and air in the first float member 11 are empty, the first floating member 11 falls very fast. Accordingly, when the first float member 11 falls, the "L"-shaped lever 61a reaches a descended position and, as the second float member 31 rises, the "L"-shaped lever 61b reaches a raised position. Accordingly, when the crank arm 63a is attached to track 65a by the pin 66a on one side of the crank 64, the other crank arm 63b is attached to track 65b by the pin 66b on the other side of the crank 64. The pins 66a and 66b are separated from each other 180° on the crank 64.

Figure 6:
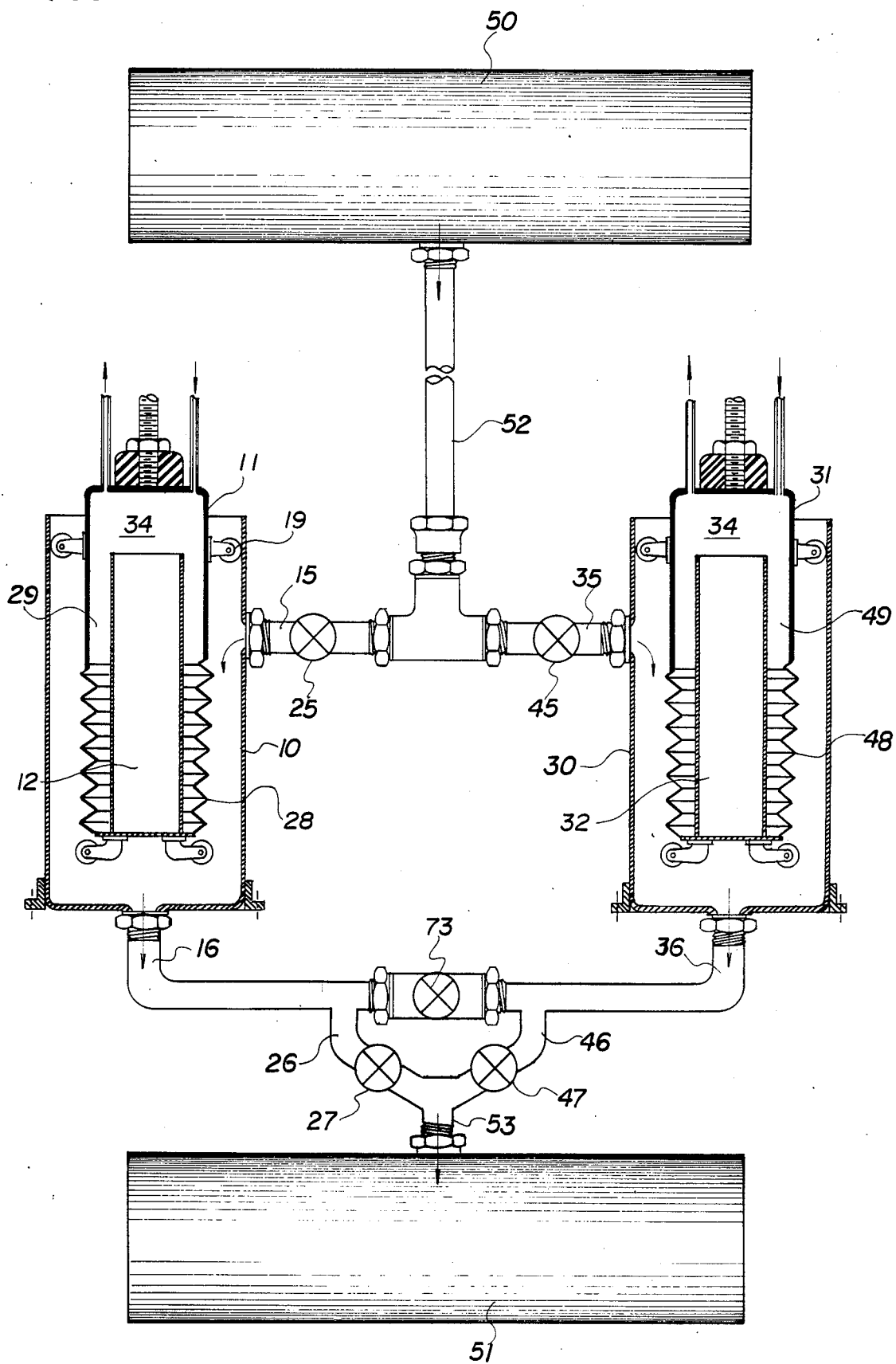
FIG. 6 diagrammatically shows the mechanical system of the present invention wherein the first and second float members are in a balanced, neutral position.

When the apparatus is positioned as shown in FIG. 5, the water supply valve 45 is closed, the drainage valve 27 is also closed and at the same time the horizontal valve 73 is open. Simultaneously, the air inlet valve 76 of the second float member 31 and the air outlet valve 77 of the first float member 11 are closed. At the same time, the air outlet valve 78 of the second float member 31 and the air inlet valve 75 of the first float member 11 are opened. The water contained in the cylinder 30 then flows naturally to the first cylinder 10 through the pipes 16 and 36 and, thereby, the two float members 11 and 31 are positioned at the same height which is equivalent to one-half of the height of the cylinders (FIG. 6). As the water moves from the second cylinder to the first cylinder, the "L"-shaped levers 61a and 61b assume equivalent positions. Accordingly, the crank 64 rotates 90° in the clockwise direction and the crank pins 66a and 66b are positioned opposite each other in the crank tracks 65a and 65b.

Figure 7:
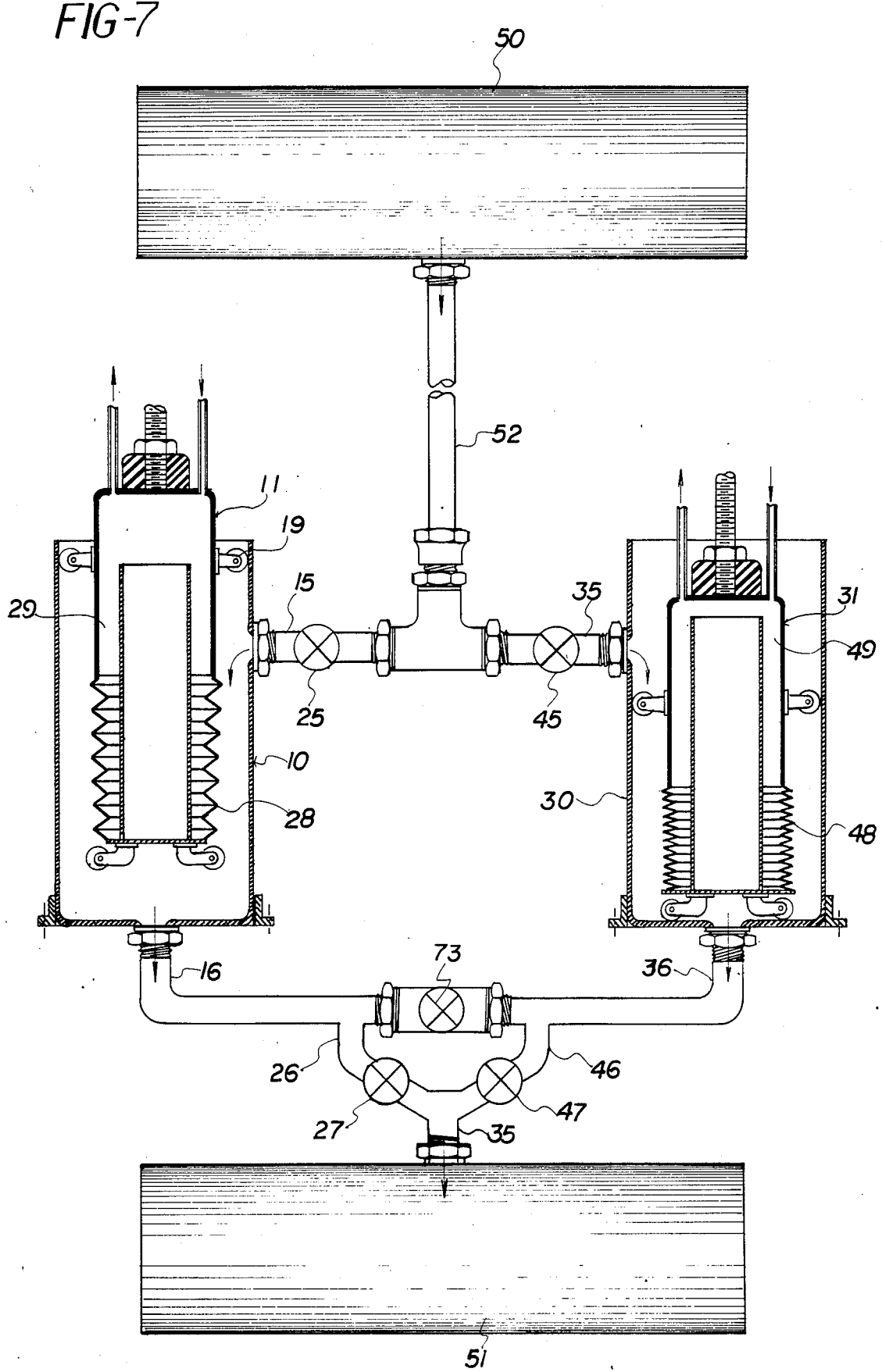
FIG. 7 diagrammatically shows the mechanical system of the present invention wherein the first float member is in its raised position and the second float member is in its lowermost position.

The opposite operation as shown in FIGS. 1, 7 and 8, comprises simultaneously, in succession, closing the water supply valve 45, closing the horizontal valve 73 and opening the drainage valve 47 and at the same time, closing the drainage valve 27 and opening the water supply valve 25. Simultaneously, in succession, the air valves 76 and 77 are closed and the air valves 75 and 78 are opened. Accordingly, the "L"-shaped lever 61a connected to the first float member 11 changes its position and, as the second float member 31 is lowered, the "L"-shaped lever 61b reaches a descended position. Accordingly, the crank 64 rotates 90° in the clockwise direction and the crank pins 66a and 66b are positioned at opposite portions on the crank tracks 65, 180° from each other. In this operation, microswitches 70 are disposed at the lower and upper ends of the levers 61a, 61b for operating the on/off switch when the levers 61a and 61b reach their lower and upper positions.

By repeating this series of steps an increased out-put force can be obtained from the "L"-shaped levers 61a and 61b.

One of the important features of the subject invention is believed to be the clearance between the float member and cylinder and, taking into consideration the water level in which the first and second float members 11 and 31 is immersed. Also, the expansion force of the air in the float assists in lifting the weight member on the float.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An apparatus for the generation of power which comprises:
   a first cylinder and a second cylinder;
   a first float member and a second float member disposed in said first and second cylinders, respectively;

a first inner cylinder and a second inner cylinder disposed in said first and second float members, respectively;

a first lever and a second lever connected to said first and second float members;

a crank member rotatably disposed on a crank shaft;

a pair of arms connected at one end to said crank member and at the other end to said first and second levers;

means for alternatively introducing and removing a fluid to and from said first and second cylinders;

means for alternatively introducing and discharging air to and from said first and second float members, whereby when the fluid and air are introduced into said first cylinder and float member, and simultaneously removed from said second cylinder and float member, the first float member is caused to rise in the first cylinder and the second float member is caused to fall in the second cylinder, causing the levers to move up and down and causing the crank to rotate about its crank shaft.

2. The apparatus of claim 1, wherein the bottoms of the first and second cylinder are connected to a main water storage tank.

3. The apparatus of claim 1, wherein the upper portions of the first and second cylinders are connected to a main water supply tank.

4. The apparatus of claim 1, wherein the lower portions of the first and second float members contain a flexible corrugated structure.

5. The apparatus of claim 1, wherein the top portions of the first and second float members are provided with an air inlet and outlet.

6. The apparatus of claim 5, wherein the air inlet is connected to a pressured air storage tank.

7. The apparatus of claim 5, wherein the air outlet is in communication with the atmosphere.

8. The apparatus of claim 1, wherein the cylinder has about twice the volume of the float member.

9. The apparatus of claim 1, wherein both levers are secured to the crank arms which are connected to the crank member.

10. The apparatus of claim 9, wherein the crank shaft of the crank member connects with a generator and the crank member is provided with tracks on opposite sides thereof for receiving a pair of crank pins connected to the ends of the crank arms.

11. The apparatus of claim 1, wherein the levers are provided with microswitches for limiting the movement of the levers.

12. The apparatus of claim 1, wherein the means for introducing and removing water or air is provided with a solenoid-type valve.

13. The apparatus of claim 12, wherein the solenoid-type valve is actuated by an on/off switch using air pressure from the pressured air compressor.

14. The apparatus of claim 1, wherein both float members contain adjustable weight members disposed on the top thereof.

15. A method for the generation of power utilizing first and second cylinders containing float members disposed therein, a weight member disposed on said float members, a lever connected to said float members at one end and to the crank at the other end thereof which is free to move up and down, and means for introducing a fluid and air into said cylinders and float members, respectively and removing said fluid and air from the cylinders and float members which method comprises:

introducing a fluid and air into said first cylinder and float member and simultaneously removing a like amount of fluid from said second cylinder and float member, whereby said fluid and air distribution causes the float member to rise in said first cylinder and fall in said second cylinder which in turn causes the lever to move up and down to rotate the crank for generating the power.

* * * * *